Figure 1:
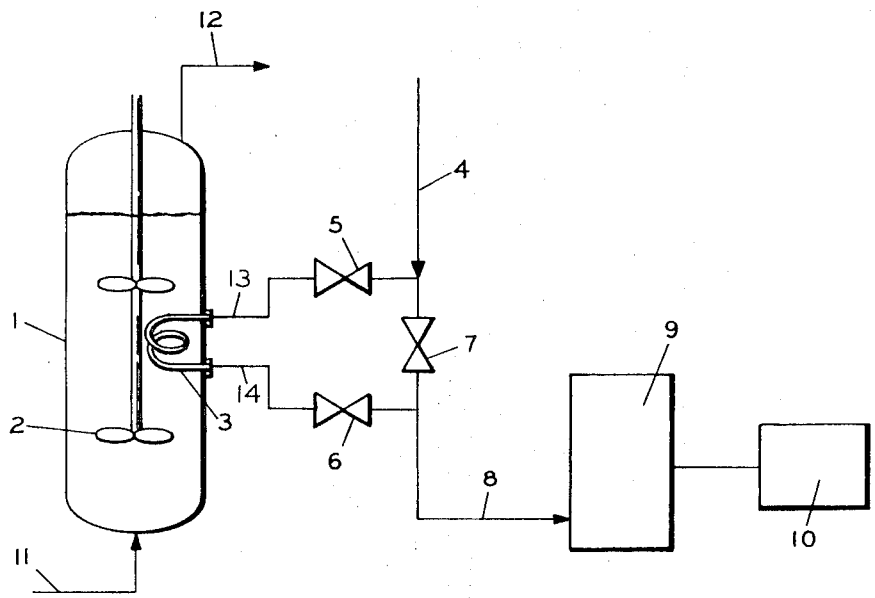

United States Patent

[11] 3,624,710

| [72] | Inventors | Don E. Carter |
| | | Creve Coeur; |
| | | Henry S. C. Yang, St. Louis, both of Mo. |
| [21] | Appl. No. | 838,974 |
| [22] | Filed | July 3, 1969 |
| [45] | Patented | Nov. 30, 1971 |
| [73] | Assignee | Monsanto Company |
| | | St. Louis, Mo. |

[54] SYSTEM FOR ANALYSIS
11 Claims, 2 Drawing Figs.

| [52] | U.S. Cl. | 73/61.1 R |
| [51] | Int. Cl. | G01n 13/00 |
| [50] | Field of Search | 73/61.1, 61, 53, 38; 210/21, 22, 23, 321 |

[56] References Cited
UNITED STATES PATENTS

| 3,367,850 | 2/1968 | Johnson | 73/61.1 UX |
| 3,498,110 | 3/1970 | Brun | 73/38 |

Primary Examiner—Louis R. Prince
Assistant Examiner—Joseph W. Roskos
Attorneys—Herman O. Bauermeister, Joseph D. Kennedy and William I. Andress ABSTRACT: A fluid mixture is analyzed by permeating at least one component through a permeable or porous material for a period of time into a collection zone, sweeping out the collected fluid sample by a carrier fluid for a specific period of time, and passing the resultant mixture to analytical means.

PATENTED NOV 30 1971

3,624,710

INVENTORS
DON E. CARTER
HENRY S.C. YANG

BY Herman O. Bauermeister
ATTORNEY

SYSTEM FOR ANALYSIS

The present invention relates to a system for the analysis of mixtures of fluids having at least one diffusible component, such as a dissolved gas in liquid.

It is an object of the invention to provide a method and apparatus for the analysis of mixtures of fluids including both gases and liquids, without disturbing possible chemical reactions which are occurring in such fluid mixtures. It is also an object of the invention to provide a method for the analysis of moving masses or streams of fluids to obtain an integrated analysis over a period of time and to provide for the analysis of diffusible or volatile components which are present in small proportions.

It is also an object of the invention to provide a method suitable for the analysis of fluids such as liquids containing high proportions of dissolved or suspended solids existing at high or low temperatures and pressures relative to the point of analysis.

In various industrial operations, such as in chemical processing plants, it is desirable to conduct rapid and frequent measurements of the concentrations of various reactants such as dissolved gases contained in a liquid medium in order to provide information for reactor control, and to direct the course of chemical reactions taking place in a reactor or moving stream of such liquid or gaseous fluid. The conventional method of taking a sample and transporting or piping it to an analytical laboratory for chemical analysis does not satisfy this requirement, particularly since chemical reactions often continue to take place and concentrations to change after a sample has been withdrawn from a reactor or conduit through which the fluid mixture is passing.

It is also a common problem in conducting analyses of fluid mixtures that an objectionable gaseous or liquid component is present which must be removed before analysis. Examples of such undesirable components include strongly acid or alkaline components as well as suspended solid and colloidal components.

It has been found that the difficulties encountered in prior art analytical procedures are overcome in the present method and apparatus based upon the diffusion or permeation of diffusible components of fluids mixtures through a permeable membrane such as a film or tube.

In general the present method comprises contacting a fluid mixture, containing at least one diffusible component against one surface of a material permeable to the diffusion of the said diffusible component, permeating at least a portion of the said diffusible component through the said permeation material, from the one surface to the other surface thereof as a collection zone. In this zone the diffusible component is collected, after which a fluid carrier medium is passed across the said other surface of said permeable material for a specific period of time the mixture of the said carrier gas and the said permeated diffusible component is withdrawn from the collection zone to an analysis zone, and the mixture analyzed for the said diffusible component.

In one embodiment of this invention, a carrier fluid, e.g. a gas flows upon one surface of the permeation membrane with the fluid to be analyzed being present at the other surface of such membrane. Permeation through the membrane causes the diffusible or volatile component which is to be analyzed, to flow through the membrane from the medium or fluid being sampled, to the other side of the membrane which acts as a collection zone. The collector zone is then swept periodically by the carrier gas stream. THe fluid to be analyzed may be either liquid, gaseous, a gas-liquid mixture, a gas-solid mixture, a liquid-solid mixture (slurry) or a gas-liquid-solid mixture.

An example of such a medium or fluid system to be analyzed is a fermentation mixture, with water being the major component of the fluid to be analyzed. The said fluid also contains high proportions of nutrients such as proteins or carbohydrates and with oxygen being dissolved from an airstream bubbling into or sparging into the fermentation mixture. It is desired to determine the proportion of oxygen as a control parameter of the fermentation. Consequently a polymeric membrane such as a fluorinated hydrocarbon (for example Teflon), natural rubber or a silicone rubber membrane is provided, for example, as a continuous tubing submerged in the fermentation mixture. Such a sample tube is provided with means to introduce into the collection side as intermittent stream of a carrier fluid, e.g. a gas stream, such as nitrogen or helium which passes across the inner surface of the said polymeric membrane and picks up the diffusible volatile component, e.g. oxygen, nitrogen and carbon dioxide gases which have permeated through the polymeric membrane. The resultant gas mixture, e.g. oxygen, nitrogen and carbon dioxide together with the carrier gas (helium), is then passed into analytical means such as a gas chromatograph, mass spectrometer, density balance, Orsat analyzer, thermal or electrical conductivity cell, refractometer, electrical conductivity or viscosity measuring instrument, infra red or ultra violet spectrometer, colorimeter, polarimeter, etc.

The permeable material which is used to permeate a volatile component into a collection zone is preferably a polymeric substance such as a fluorinated olefin, e.g. a tetrafluoroethylene polymer of a copolymer of tetrafluoroethylene with hexafluoropropylene. However, other halogens may also be present for example as a chlorofluoropropylene or a chlorofluoroethylene.

Other permeable materials useful in the practice of the invention include polyvinyl, chloride, polyethylene, carbonized acrylonitrile, and silicone rubbers. Silicone rubbers are based upon various siloxanes such as dimethyl siloxanes, and copolymers with other diorganosiloxanes in which the organic radical is preferably metal, ethyl, or aryl such as phenyl or tolyl, although other substituents such as cyanoalkyl radicals, e.g. cyanoethyl or cyanopropyl may also be present. U.S. Pat. Nos. which show the preparation of suitable permeable materials include the following:

| | |
|---|---|
| 3,296,182 | 3,261,803 |
| 3,287,310 | 3,261,802 |
| 3,086,954 | 3,234,175 |
| 3,268,473 | 3,234,174 |
| 2,890,188 | 3,183,205 |

The present method utilizes a collection period during which the diffusible component passes through the permeable material, followed by a sampling or sweep-out method.

In carrying out the process of the present invention the two respective time intervals are selected so that an adequate sample of permeated material for accurate analysis is collected. The interval depends on the analytical means used. For a gas chromatograph, the sample collection time (when there is no flow through the chamber) for specific cases may be between 3 seconds and 30 minutes and preferably between 1 and 10 minutes. When liquid carrier is used the sample collection time may be as long as 2 hours. However still longer time periods may be desirable when employing an integrated sampling procedure. In general the time when the sample is being swept or purged from the collection means may vary from 0.0001 to 0.4 and preferably 0.001 to 0.2 of the sample collection time.

Analysis by the method of this invention results in an integration of the assay over the period of the sampling time. The sampling period may be set long enough to acquire sufficient permeated sample to analyze accurately. In this way it is possible to analyze for components present in very low concentration. It is also possible to make the sampling period very long, e.g. 24 hours, and obtain directly a sample representative of the complete period.

The present method is especially useful in using an internal standard. An internal standard, in analysis of unknowns, as by chromatography, is a component whose concentration is known. It may be originally be in or added to the sample. In the case of analysis of fermentation broth for dissolved gases, the nitrogen present in the reactor exit gas serves as an internal standard. Since elemental nitrogen is neither produced nor consumed by the fermentation reaction, there is no net transfer of nitrogen in the fermentation reactor between the gas and liquid phases. Therefore, the nitrogen content of these two phases is in equilibrium and the partial pressure of the dissolved nitrogen is equal to the partial pressure of the nitrogen in the gas leaving the reactor.

The response of the chromatograph or other detector to this known partial pressure of nitrogen can be continuously observed. If the response changes, it is obvious that the calibrations of the instrument have drifted. Usually the internal standard and unknown calibrations drift proportionally, so that adjustments to the unknown calibrations can readily be made.

The present invention is applicable both to permeable and porous materials as membranes through which the volatile or diffusible component passes to enter a collection zone. The porous medium may be a porous graphite, porous silicon carbide, porous mineral, or a ceramic material, compressed metal powder compact, etc., through which convective flow takes place. In this embodiment of the invention, convection is the predominant mechanism by which the volatile, e.g. gaseous component passes through the porous medium.

In carrying out this analytical process, the porous membranes or collection tube is first purged with an inert gas such as nitrogen, or helium, after which the volatile components are allowed to pass by convection through the porous medium. The volatile gases, e.g. $CO_2$, $N_2$ and $O_2$ thus pass from the external surface of the porous medium to the other side which is enclosed to provide a collection zone. Such collection period extends for a sufficient time to yield a sufficient sample. A carrier fluid, e.g. a noble gas such as helium, argon, krypton or xenon then purges out the collected sample. The time of such purging step is less than the collection time, a preferred range being 0.0001 to 0.2 of the time of the collection portion of the cycle. This embodiment of the invention can be used at high temperatures such as in flue gas analysis and sulfuric acid manufacture to determine the $SO_2$, $SO_3$ and $CO_2$ content of gas streams. An advantage of the present invention is that the porous medium may be cleared of dust and other deposits by the use of a sweep-out stream of gas at a higher pressure than exists in the ambient fluid being analyzed.

One of the embodiments of the invention uses diffusion of the desired component through a permeable medium. The sample of material which is to be analyzed by the chromatograph passes through the wall of the sampling membrane or tube by the process of molecular diffusion–not by the convection such as occurs by flow through a porous wall under the influence of a pressure gradient. Molecular diffusion is commonly described mathematically by Fick's Law, which states that the mass flux of a material undergoing molecular diffusion through a membrane is proportional to the concentration gradient of the permeating component across the membrane. (Perry, J. H., R. H. Perry, C. H. Chilton, and S. D. Kirkpatrick, Chemical Engineers' Handbook, 4th Edition, p. 17-43. McGraw-Hill (1963)).

At the start of each sampling period the sample tube is filled with pure helium or other fluid. Therefore the rate of diffusion of sample components from the fluid outside the tube into the tube is proportional to the partial pressures of the individual components in the fluid. This situation persists throughout the sampling period because, while the component partial pressures inside the tube rise to the point where they can be analyzed readily, they are still very low compared with the partial pressures of the fluid outside the tube. In other words, the amount of a sample component that gets inside the tube for any set sampling period is proportional in practice only to its partial pressure in the fluid outside the tube.

Figure 2:
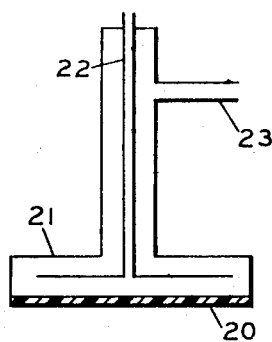

The drawings illustrate one method of carrying out the present invention. FIG. 1 shows a reactor provided with a permeable material in order to obtain a sample of dissolved gases in the liquid reaction medium contained in the reactor vessel. FIG. 2 shows a modification of the permeation material in order to provide a flat membrane for permeation of the gases to be analyzed.

The drawings of the present patent application illustrate a specific embodiment of the invention utilizing the present apparatus in a reaction vessel such as is employed in conducting a fermentation. In the fermentation, oxygen is supplied to the liquid reaction medium, for example a water medium containing dispersed and dissolved carbohydrate and protein nutrients such as starch, ground corn, wheat bran, rice bran, molasses, sugar corn steep liquor, fish meal, meat meal, soy bean meal, etc.

To conduct a fermentation reaction, the medium is heated to a temperature which will destroy all micro-organisms present in it, cooled to a suitable temperature, and inoculated with a culture of the organism to be grown. Oxygen, preferably as a stream of air is sparged or bubbled into the reaction vessel, with the exit gas stream leaving from the top of the fermentation reactor. The micro-organisms feed upon the nutrients using oxygen absorbed from the airstream in their metabolic processes. They reject the carbon dioxide produced in their metabolic processes into the liquid from where it is absorbed into the airstream. In FIG. 1 the reactor is designated as element 1 provided with a stirrer 2. The permeation material such as coiled length of silicone rubber tubing located within the reactor element 3. External leads 13 and 14 of nonpermeable material connect element 3 with external valves 5 and 6.

In order to provide for a carrier fluid to sweep a sample from permeation tubing 3, line 4 provides a stream of a carrier such as a gas, for example helium, nitrogen, argon, etc. A system of valves 5, 6 and 7 provides for the passage of the carrier gas through permeable tubing when valve 7 is closed, but valves 5 and 6 are open. When it is desired to shut off the permeation loop, valves 5 and 6 are closed, with valve 7 being open. In this circumstance, the dissolved gases such as oxygen, nitrogen and carbon dioxide which are present in the liquid reaction medium, permeate from the outer surface to the inner surface loop 3, and thus are collected inside loop 3 as a collection zone until an analysis is desired. At such time valve 7 is closed, and valves 5 and 6 are opened to permit the carrier gas to sweep through the collection zone, e.g. permeation loop 3, with the sample then exiting through line 8 into analytical means 9, and with the response being recorded on recorder 10.

FIG. 2 illustrates another form of the permeable detector unit employed to detect the volatile component dissolved in a fluid medium. In FIG. 2 the permeable material is used as a flat membrane 20 which is mounted in a holder 21. The carrier gas is admitted through line 23 to sweep across the inner surface of the permeable membrane with the exit gas from this detector leaving by line 22, although the carrier gas may also flow in the opposite direction. In using the device of FIG. 2, the entire assembly may be mounted in a reactor vessel, pipeline or other space in which the volatile component is to be detected. Volatile components such as oxygen, nitrogen, carbon dioxide, as well as organic components, such as benzene, are thus transmitted from the outer surface of permeable membrane 20 into the inner volume of the body 21, thus providing a collection zone. In this way, gases which are present in a gaseous mixture outside the membrane, or as dissolved components as a liquid outside the membrane, permeate into the collection zone. When it is desired to obtain a sample for analysis, a carrier gas such as helium or nitrogen is passed by line 23 to the body 21 of the unit so that the carrier gas sweeps across the inner surface of membrane 20. The sample of the carrier gas with permeated gases to be analyzed then leaves by line 22 to be introduced into the analytical unit 9, with the result being recorded on recorder 10. If the carrier fluid in the body 21 is a liquid, such as water, components of low volatility such as amino acids or enzymes may be permeated in accordance with the present invention, and analyzed by appropriate means in such as an automated wet chemical analyzer.

In the operation of the present system the volatile gas to be analyzed permeates through the permeable membrane into a collection zone. While it is technically advantageous to remove such permeated gas sample from the collection zone to the analysis zone by sweeping with a carrier gas, it is also a part of the invention to apply a vacuum at the analyzer to draw the sample from the collection zone into the analyzer.

The present invention is of utility in analyzing sewage treatment mixtures as another example of a fermentation system.

The present invention is also useful in tissue culture to propagate plant or animal cells. Great difficulty has been encountered in attempting gas analyzers from tissue cultures using the prior art detectors. Tissue culture is the process of growing differentiated animal or plant cells in aerated nutrient broths. In tissue culture systems ut us important that the dissolved oxygen and carbon dioxide concentrations be accurately controlled. It is also important that the calibration of the instrument remain steady over the long periods, e.g. up to 60 days that a run requires. The permeation membrane material in contact with the nutrient broth must be sterilizable and must not introduce extraneous materials into the culture.[1]([1]V asseller, B. V. and G. E. Moore, Research/Development 20, No. 5, 20–24 (1969).)

The instrument described in this application meets all these requirements because the permeation probe is sterilizable and the calibration can be checked by comparison of the known nitrogen content of the air with the instrument output. The present device introduces no outside materials into the broth except for a negligible amount of helium which diffuses out of the silicone of other polymeric permeable tube.

The following examples thus state specific embodiments of the present invention:

EXAMPLE 1

The present example shows the use of the invention in analyzing fermentation broth for dissolved oxygen, carbon dioxide and nitrogen. The sampler consisting of 10 feet of ⅛-inch O.D. × 1/32-inch wall tubing is mounted in a 17,000 gallon fermentation reactor and connected as shown in FIG. 1.

The chromatograph 9 contains three columns in series. The first column in the series is 0.2-inch I.D. × 6 inches long and is packed with a styrene-divinylbenzene copolymer. The second column is 0.2-inch I.D. × 72 inches long and is packed with 30/60 mesh silica gel, while the third column is 0.2-inch I.D. × 72 inches long and is packed with 30/60 mesh Linde 5A molecular sieve, a synthetic zeolite.

The carrier helium flow rate is 180 ml./minute. The oven of the chromatograph is maintained at 45° C. the sample system is operated on the following time cycle

| Time | Valves 5 and 6 | Valve 7 |
|---|---|---|
| 50 sec. | open | closed |
| 520 sec. | closed | open |

Thus the collection zone is used to collect a sample for 520 seconds, while the sweep out time (helium gas carrier) is 50 seconds. The ratio of sampling time to collection time is 50/520 = 0.096.

The sample from the sampler first enters the first column which retains the water. As soon as the $CO_2$, $O_2$ and $N_2$ pass out of the column, the first column is bypassed by the helium carrier gas and the water backflushed from it with helium to the atmosphere.

Meanwhile the $CO_2$, $O_2$ and $N_2$ pass to the silica gel column which separates the $CO_2$ from the $O_2$ and $N_2$. The $O_2$ and $N_2$ pass into the 5A molecular sieve column which separates the $O_2$ and $N_2$. The $O_2$ and $N_2$ emerge from the column separately and pass through the chromatograph detector which records responses proportional to their concentrations.

At this time the $CO_2$ has still not emerged from the silica gel column. As soon as the $O_2$ and $N_2$ have passed through the detector, the outlet of the silica gel column is connected directly to the detector, which records the response to the carbon dioxide peak as it emerges from the silica gel column.

After this is completed the entire cycle is repeated.

The responses to the $O_2$, $N_2$ and $CO_2$ peaks are recorded on the chart of recorder 10, and by reference to the instrument calibration curves, determined by passing air $CO_2$ mixtures of known composition through nonfermenting broths the following dissolved gas partial pressures are determined.

|  | Peak Height (units) | Partial Pressure (atm.) |
|---|---|---|
| oxygen | 50 | 0.216 |
| nitrogen | 70.8 | 0.948 |
| carbon dioxide | 15.1 | 0.036 |

In order to compare the method of the present invention against continuous sweeping of sample, a continuous sweep gas flow of 50 cc. per minute is employed with a sample tube of 5 cc. volume operated to supply a vapor phase chromatograph with an injection frequency of 9 minutes. The sample tube contains 5/450=0.011 of the material which diffuses through the tube. However, the present invention, with intermittent flow, employs all the sample that diffuses through the tube e.g., 1.00 of the material which diffuses through the tube. Therefore the sample by the present method is about $(1/0.011) = \Phi \sim 91$ times larger than that obtained by a continuous purged sampling system.

EXAMPLE 2

The present example shows the determination of protease enzyme in fermentation broth. A membrane of silicon rubber is placed in a 6 inch diameter membrane holder of the type shown in FIG. 2. The membrane holder is mounted inside a fermentation reactor. The holder is connected to a water carrier stream by valves arranged as shown in FIG. 1.

The fermentation reactor is charged with a nutrient system consisting essentially of:

| Wheat Bran | 5,000 lbs. |
|---|---|
| Ground Corn | 4,000 lbs. |
| Rice Bran | 3,000 lbs. |
| Water | 88,000 lbs. |

The charge is heat sterilized, cooled to 25°–45° C. and inoculated with a culture of *Bacillus subtilis*. Air is sparged into the reactor as shown in FIG. 1. After 15 hours a significant protease enzyme concentration develops in the fermentation broth. The protease diffuses through the membrane into the water in the collecting side.

The carrier water stream is purged from the membrane holder at 30 minute intervals. The membrane holder contains 10 cc. of water. The purge stream flows 3 seconds at the rate of 10 cc./second. The collected water sample contains the protease enzyme that diffuses through the membrane.

The water contains the enzyme which diffuses through the membrane after the sampler was previously purged. The water containing the sample passes to a Technicon auto-analyzer set up to measure protease by the casein digestion method.[1] ([1] Kunitz, M., J. Gen. Physiol. 30, 291 (1947). The frequency of sampling is 30 minutes. The output recorder for the auto-analyzer indicates the total protease in each sample.

The assays recorded for each hour are shown below. (The protease units are based on an arbitrary peak in accordance with the ability to hydrolyze casein).

|  | Protease Units Per ml. Broth |
|---|---|
| 15 hours | 500 |
| 16 hours | 1,000 |
| 17 hours | 2,000 |
| 18 hours | 3,500 |
| 19 hours | 5,000 |
| 20 hours | 7,000 |
| 21 hours | 10,000 |
| 22 hours | 15,000 |
| 23 hours | 16,000 |
| 24 hours | 15,500 |
| 25 hours | 15,000 |

The run is terminated after the 25th hour.

EXAMPLE 3

The present example shows the analysis of a gas mixture. A stream of mixed air and carbon dioxide containing a small amount of suspended solids is to be analyzed for carbon dioxide. A membrane consisting of 20 feet of 1/16-inch I.D. × 1/32-inch wall thickness silicone rubber tube is mounted in a duct carrying the gas mixture at 2 atm. absolute pressure. The system is connected to a gas chromatograph as shown in FIG. 1. The chromatograph column is 0.2-inch I.D. × 6.5 feet long and is packed with 30/60 mesh silica gel.

The system is operated cyclically in the following time cycle

| Time | Valves 5 and 6 | Valve 7 |
|---|---|---|
| 10 sec. | open | closed |
| 230 sec. | closed | open | so that the ratio of sampling time to collection time is 10/230= 0.0435.

The silica gel column separates the carbon dioxide from the nitrogen and oxygen. For each sample injection the recorder records two responses—the first one for the oxygen and nitrogen combined and the second for the carbon dioxide.

At a particular time the $CO_2$ peak on recorder 10 is observed to be 32.4 units. By reference to a previously determined calibration curve, the $CO_2$ partial pressure is found to be 0.15 atm. The $CO_2$ concentration is therefore (0.15/2.0)× 100=7.5 mole percent.

EXAMPLE 4

A system connected as shown in FIG. 1 is used to analyze xylene-benzene mixtures, representative of a liquid-liquid mixture. The sampling membrane is a 2½-inch diameter circle of 0.001-inch-thick polyethylene film mounted in a holder of the type shown in FIG. 2. The liquid mixture is held in a beaker at 25° C.

The chromatographic column is 0.2-inch I.D. × 6 feet long and packed with 5 percent polypropylene glycol on 30/60 mesh firebrick support. The oven is operated at 110° C. The response of the column to the components is determined by integrating the area under the peaks.

The diffusible components, xylene and benzene, are permitted to diffuse through the polyethylene for 400 seconds. The carrier gas (helium or nitrogen) is passed over the polyethylene for 20 seconds.

The results are as follows when helium is used as the carrier gas.

| Wt. Percent Xylene in Mixture | Area Under Peak (Relative Units) | |
|---|---|---|
| | Xylene | Benzene |
| 80 | 1,402 | 400 |
| 60 | 1,190 | 666 |
| 40 | 790 | 730 |

EXAMPLE 5

The conditions are the same as in example 4 except the solution is a mixture of 42.9 percent acetonitrile and 57.1 percent isopropanol by weight. The membrane is a 0.0003-inch-thick polyvinyl chloride film. Four successive injection cycles of collecting and sweeping give the following results:

| Injection No. | Area Under Peak (Relative Units) | |
|---|---|---|
| | Acetonitrile | Isopropanol |
| 1 | 631 | 2,595 |
| 2 | 619 | 2,561 |
| 3 | 635 | 2,621 |
| 4 | 678 | 2,720 |

EXAMPLE 6

The conditions are the same as in example 4 except that the solution in contact with the membrane is 50 percent cyclohexane and 50 percent toluene by weight. Four successive injection cycles of sample collection and purging give the follow results.

| Injection No. | Area Under Peak (Relative Units) | |
|---|---|---|
| | Cyclohexane | Toluene |
| 1 | 332 | 551 |
| 2 | 328 | 529 |
| 3 | | 555 |
| 4 | 330 | 561 |

EXAMPLE 7

The use of a porous collection medium is shown in a flue gas analysis system. The apparatus of FIG. 1 is modified to employ a porous ceramic tube mounted in a flue gas duct. The porous tube is purged with helium after which the helium gas is turned off. The flue gases flow by convection through the porous tube for a period of 10 minutes.

The collected gases are then passed to the vapor phase chromatograph during a 1 minute purge of the collection zone by a stream of argon. The analysis of the sample is:
$SO_2$ 3 percent (vol.)
$SO_3$ 0.3 percent (vol.)

What is claimed is:

1. Method for the analysis of at least one diffusible component dissolved in a fluid mixture which comprises contacting the said fluid mixture against one surface of a material permeable to the diffusion of the said diffusible component, permeating at least a portion of the said diffusible component through the said permeation material, from the one surface to the other surface thereof as a collection zone, and there collecting the said diffusible component for a collection period, passing a fluid carrier medium across the said other surface of said permeable material for a specific period of time which period of time is from 0.0001 to 0.4 of the collection period, withdrawing the mixture of the said carrier and the said permeated diffusible component from the collection zone to an analysis zone, and thereafter analyzing the said mixture for the said diffusible component.

2. Method as in claim 1 in which the fluid mixture to be analyzed is a liquid.

3. Method as in claim 1 in which the fluid mixture contains dispersed solids.

4. Method as in claim 1 in which the fluid mixture is an aqueous fermentation medium and the diffusible components to be analyzed comprise carbon dioxide and oxygen.

5. Method as in claim 4 in which the fluid mixture contains a culture which is being propagated, and which is derived from plant or animal cells.

6. Method as in claim 1 in which the analysis zone is a vapor phase chromatograph.

7. Method as in claim 1 in which the volatile components analyzed are oxygen, nitrogen and carbon dioxide.

8. Method as in claim 1 in which the permeable material is a silicone rubber.

9. Method as in claim 1 in which the permeable material is a fluorocarbon composition.

10. Method for the analysis of at least one gaseous component dissolved in a liquid, which comprises contacting the said liquid against one surface of a polymeric material permeable to the diffusion of the said gas, permeating at least a portion of the said gas through the said permeation material, from the one surface to the other surface thereof as a collection zone, and there collecting the said gas, passing a carrier gas across the said other surface of said permeable material for a period of time of from 0.0001 to 0.4 of the time of the collection of the said gas, withdrawing the mixture of the said gaseous component and the said carrier gas to an analysis zone, and thereafter analyzing the said mixture for the said gaseous component.

11. Method for the analysis of at least one volatile component dissolved in a fluid mixture which comprises contacting the said fluid mixture against one surface of a porous material, permeating at least a portion of the said volatile component through the said porous material, from the one surface to the other surface thereof as a collection zone, and there collecting the said volatile component for a collection period, passing a fluid carrier medium across the said other surface of said porous material for a specific period of time which period of time is from 0.0001 to 0.4 of the collection period, withdrawing the mixture of the said carrier medium and the said permeated volatile component from the collection zone to an analysis zone, and thereafter analyzing the said mixture for the said volatile component.

* * * * *